July 21, 1942.  A. J. NEU, JR  2,290,292
PHOTOGRAPHIC PRINTING DEVICE
Filed May 10, 1941  2 Sheets-Sheet 2
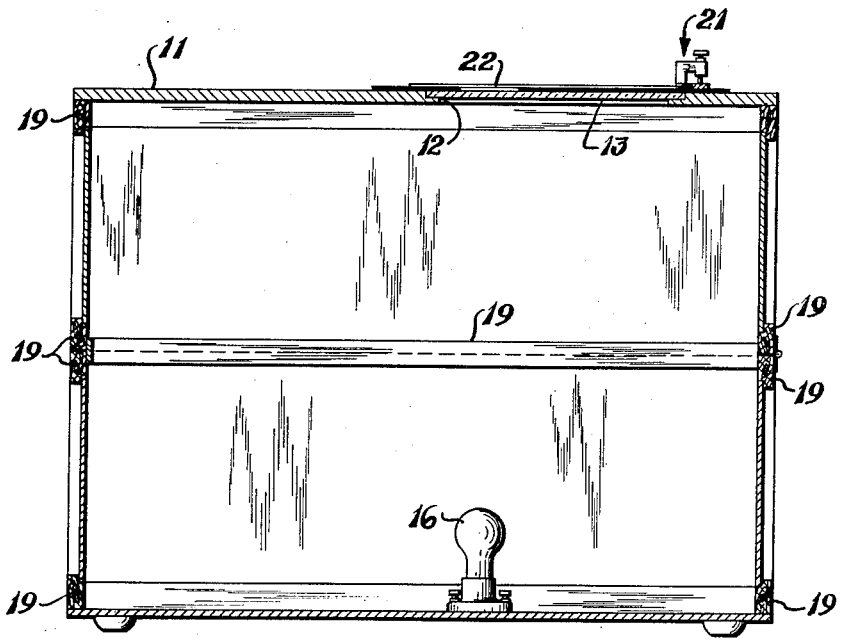
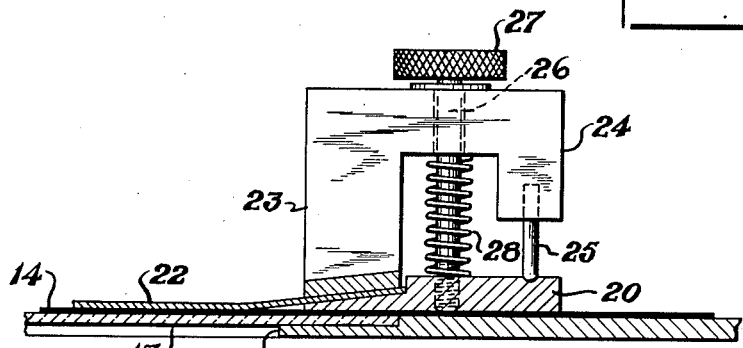
INVENTOR
*Arthur J. Neu, Jr.*
BY
*Richards & Geier*
ATTORNEYS Patented July 21, 1942

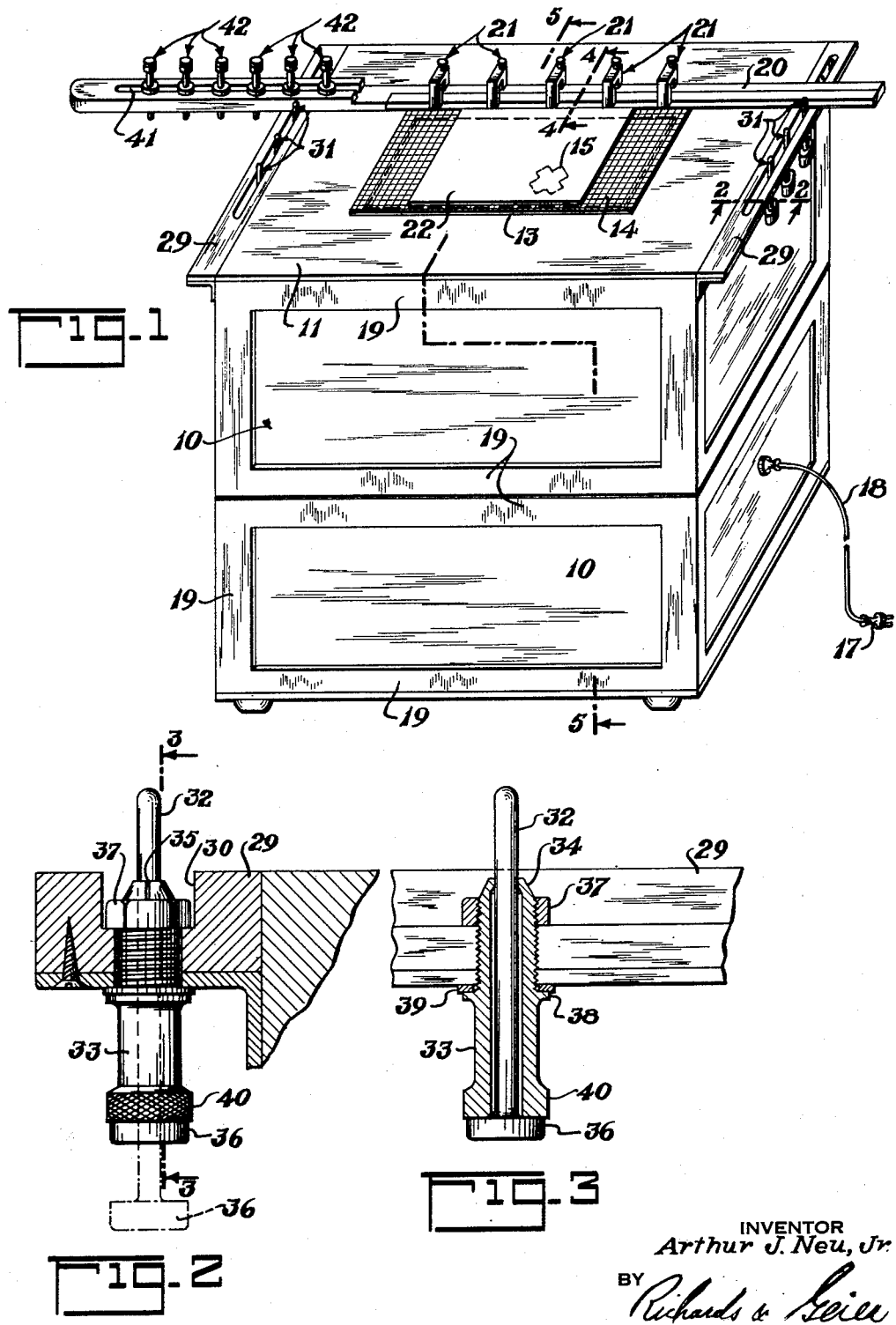

2,290,292

UNITED STATES PATENT OFFICE 2,290,292

PHOTOGRAPHIC PRINTING DEVICE

Arthur J. Neu, Jr., East Orange, N. J.

Application May 10, 1941, Serial No. 392,865

2 Claims. (Cl. 95—73)

This invention relates to a photographic printing device for reproducing a multiplicity of prints from a single image arranged in symmetrical relation.

The primary object of the invention is to provide an improved device whereby a multiplicity of prints may be made on a sensitized firm or plate in a minimum of time.

Another object is to provide a measuring device in a photographic printing machine which will make possible the production of a multiplicity of prints on a sensitized film or plate from a single image, which prints are spaced accurately in symmetrical relation.

A still further object is to provide a photographic printing device which will make possible the production of a plurality of accurately spaced prints from a single image.

A still further object is to provide a photographic apparatus which would make possible the production of color negatives which, when superimposed upon one another, will produce a symmetric whole in which the various colors are in perfect registry.

Further objects and advantages of this invention will become apparent from the following description when taken in conjunction with the accompanying drawings which show by way of example a preferred embodiment of the invention.

In the drawings:

Figure 1 is a perspective view of a photographic printing device according to the invention.

Figure 2 is an enlarged fragmentary section taken along the line 2—2 of Figure 1.

Figure 3 is an enlarged fragmentary section taken along the line 3—3 of Figure 2.

Figure 4 is an enlarged section taken along the line 4—4 of Figure 1.

Figure 5 is a section taken along the line 5—5 of Figure 1.

In terms of broad inclusion the invention contemplates a measuring means for shifting a sensitized film or plate to different printing positions, so that a multiplicity of prints may be produced which are accurately spaced in symmetrical relationship.

Referring in greater detail to the invention, the device comprises a light-proof box 10, having a top member or frame 11.

The frame 11 has an opening 12 which is covered by a glass plate 13.

A mask 14, having an opening 15 for accommodating the positive image to be photographed, may be disposed over the glass plate 13.

A light source 16 which in the example shown in the drawings consists of a conventional incandescent lamp, that may be ignited by connecting the plug 17 at the end of the lead 18 to an outlet for an electric current, disposed in the bottom of the box.

The box 10 may be provided with reinforcing ribs 19.

The means for measuring off the multiplicity of prints on the sensitized film comprises a slide bar 20 which may be disposed transversely across the frame 11, as shown in Figure 1 of the drawings. The slide bar 20 is provided with clamping members, generally indicated at 21, for holding the sensitized film or plate 22.

The clamping members 21 comprise a U-shaped member having legs 23 and 24. The bottom surface of the leg 23 is bevelled for the purpose of more firmly clamping the film 22 against the bevelled surface of the bar 20, as shown in Figure 4 of the drawings. The leg 24 is provided with a guide pin 25.

The clamping member, comprising the legs 23 and 24, may be raised or lowered by means of a bolt 26, having a thumb screw 27. The bolt 26 screw-threadedly engages the slide bar 20.

An expansion spring 28 is in the post between the slide bar 20 and the bend of the U-shaped clamping member to raise the latter as the bolt 26 is unscrewed from the slide bar 20.

A pair of bars 29 are disposed at opposite sides of the frame 11 in which are provided slideways 30.

A plurality of stop pins or abutment members 31 engage the slideway 30. These stop pins or abutment members, generally indicated at 31, comprise a post 32 which is frictionally reciprocable within the sleeve member 33 by means of the reduced portion 34. The reduced portion 34 is provided with slots 35 to make it more resilient. The lower end of the post 32 is provided with an abutment 36.

The stop pins may be adjustably secured in the slideway 30 by means of the slide nuts 37 engaging the screw threaded portion of the sleeve member 33, which serves to clamp it in the guideway against the collar 38 and the washer 39.

The sleeve member 33 is provided with a knurled end 40.

It will be understood that the sleeve member 33 may be unclamped from the slideway 30 simply by turning the knurled end 40 in the proper direction. The stop pins can thus be adjusted in any desired position.

The slide bar 20 is provided with an extension having a slideway 41 similar to the slideway 30 in the bar 29.

A plurality of stop pins or abutments, generally indicated at 42, are engaged in the slideway 41. These stop pins or abutment members 42 are identical in construction with the stop pins or abutment members 31. Their position, however, is reversed, so that instead of projecting upwardly, as do the stop pins 31, they project downwardly to engage the exterior side of the bars 29.

When it is desired to make a multiplicity of prints upon a single film, the stop pins in the slideways are spaced apart and locked in position according to the length of the image.

The posts 32 are pushed upwardly to project above the slideways, as shown in Figure 1 of the drawings.

The stop pins 42 on the slide bar are similarly spaced apart and locked into position according to the width of the image. The film 22 is then clamped by the slide bar and the latter is positioned on top of the box, so that the forward edge engages the first set of pins in the two slideways and the innermost stop pin on the slide bar engages the outer edge of the bar 29. In this position, the film should be so arranged that the lower distant corner fits over the image. The film is pressed firmly against the image and the light is then flashed on and the film exposed in the ordinary manner.

The first set of stop pins on the bars 29 are then pressed downward manually by the operator and the slide bar is moved to engage the next set of pins. The light is then again flashed on and the film again exposed. These operations are repeated until the entire length of the film has been exposed. The first pin of the pins 42 is then raised and the bar moved across the frame 11, so that the next pin of the pins 42 is made to engage the bar 29. All the pins 31 are pushed back so that they project above the slideways. A second row of images may thus be exposed on the film and additional rows may be produced simply by moving the slide bar 29 across the frame 11 step-wise according to the spacing of the stop pins 42.

It will be understood that color prints in which the different colors are in register with one another may easily be made by means of the apparatus according to the invention. The film is first exposed to the image of one color and then another film is exposed to the image of another color, while the stop pins 31 and 42 are retained in the same position.

It will be understood that the foregoing description has been given by way of example only and not by way of limitation. On the other hand, the invention blends itself into a variety of expressions within the scope of the following claims.

What is claimed is:

1. In a photographic printing device, a light source, a frame for holding an image disposed in the field of said light source and means for shifting a sensitized film to different printing positions relative to said image, said means comprising a slide member having clamping members for holding a sensitized film and being adapted to be transversely disposed across said frame, a slideway in at least one end of said member, a plurality of stop pins adjustably engaging said slideway, a pair of slideways disposed at opposite sides of said frame, a plurality of stop pins adjustably engaging said last mentioned slideways, all of said pins being reciprocable in a perpendicular direction whereby said slide bar may be moved across said frame in directions at right angles to one another by depressing and raising the respective stop pins.

2. A photographic printing device in accordance with claim 1, wherein said stop pin comprises a sleeve member extending into said slideway, means carried by said sleeve member for clamping the same in said slideway, and a reciprocable post frictionally engaged by said sleeve member and adapted to extend above said slideway.

ARTHUR J. NEU, Jr.